Sept. 17, 1968 G. L. TRUMBO 3,401,476
DECOY CONSTRUCTION
Filed June 13, 1966 3 Sheets-Sheet 1
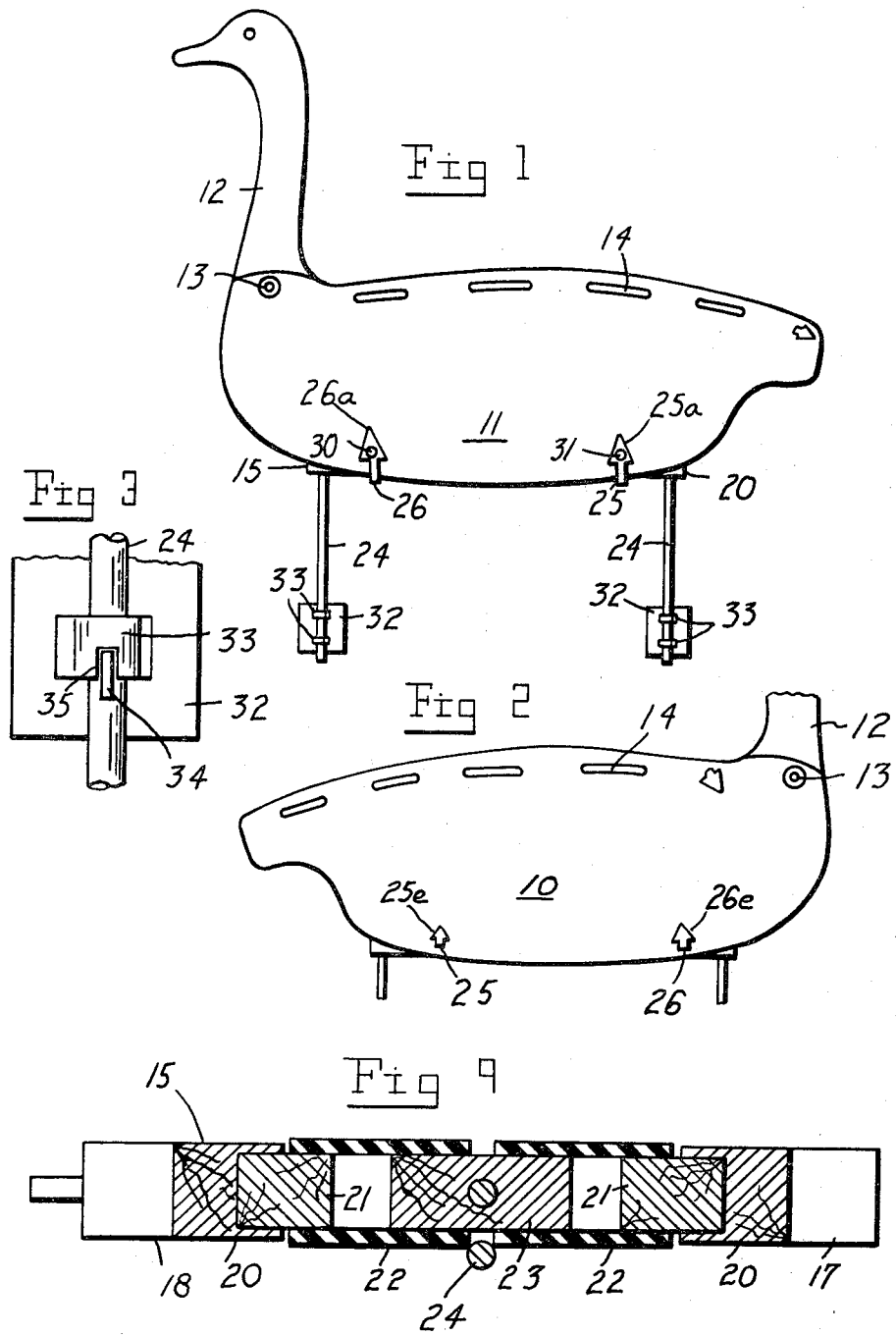
INVENTOR.
GEORGE L. TRUMBO
BY
ATTYS.

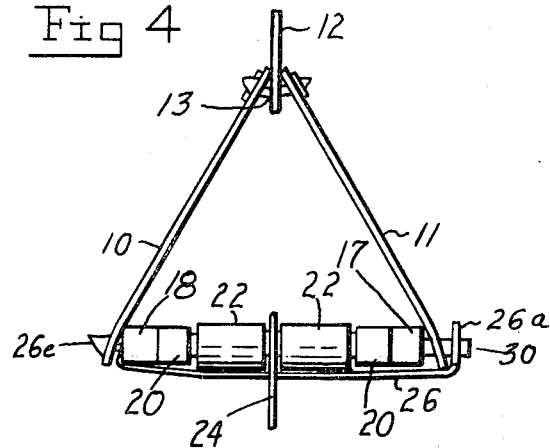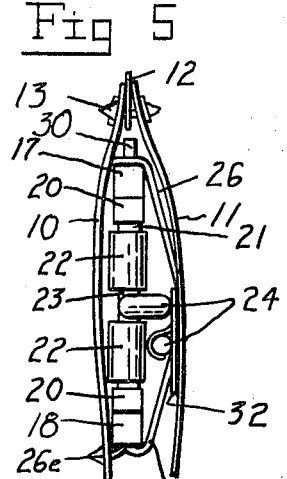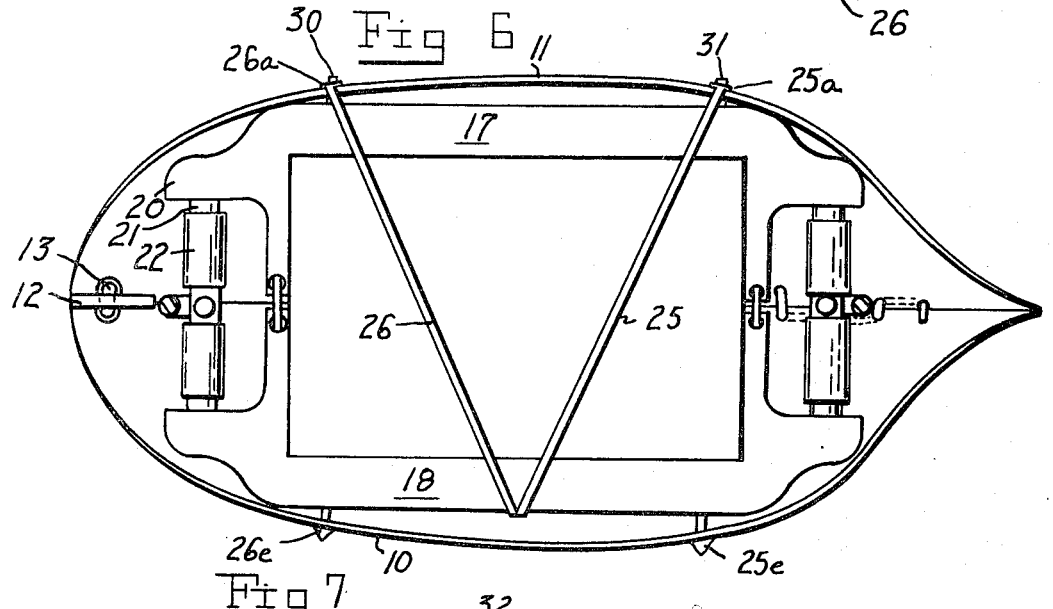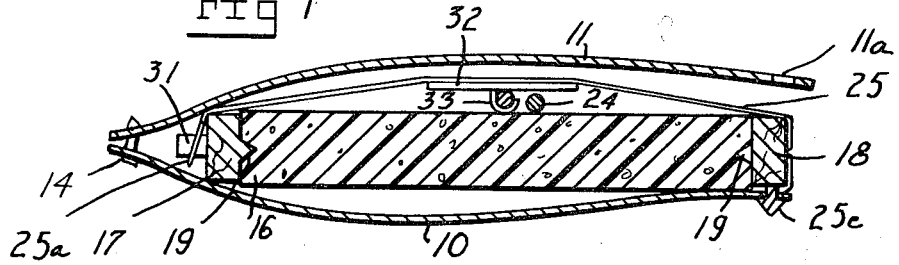

Sept. 17, 1968       G. L. TRUMBO       3,401,476

DECOY CONSTRUCTION

Filed June 13, 1966       3 Sheets-Sheet 3

INVENTOR.
GEORGE L. TRUMBO
BY
ATTYS.

United States Patent Office 3,401,476
Patented Sept. 17, 1968

3,401,476
DECOY CONSTRUCTION
George L. Trumbo, Box 2292,
Idaho Falls, Idaho 83401
Filed June 13, 1966, Ser. No. 557,031
8 Claims. (Cl. 43—3)

My invention relates to decoys for use by hunters for attracting birds such as geese and ducks. Such decoys are used quite extensively. They may be molded body type or a folding type. Each has its advantages and disadvantages. The molded bodies look more natural but they are bulky and hard to carry out and put in place. The folding type are easier to carry, but lack versatility in use. For many hunters it is desirable to have decoys to float on the water and decoys that can also be put down in a field.

According to my invention, I provide a decoy that has the advantage of folding so that one person can carry several of the decoys to the area where they are set up and they will occupy a small storage space. The decoy also has the advantage of a base float element that, in use, functions to support the folding sides spread out and to mount standards that can be stuck in the ground when the decoys are placed in a field and can be used in the water to keep the decoy upright and stable. The base float element is arranged to swing between the sides of the decoy for carrying and storage.

The nature and advantages of my invention will appear more fully from the following description and the accompanying drawings which disclose a preferred form of the invention. It is obvious, however, that various modifications may be made in the details of construction within the scope of my invention as defined in the claims.

In the drawings:

FIGURE 1 is a side view of the decoy embodying my invention;

FIGURE 2 is a side view with parts left off showing the opposite side of the decoy of FIGURE 1;

FIGURE 3 is an enlarged fragmentary side view of one of the standards for supporting the decoy;

FIGURE 4 is a front view of the decoy shown in FIGURE 1;

FIGURE 5 is a front view of the decoy folded up;

FIGURE 6 is an enlarged bottom plan view looking up at FIGURE 4;

FIGURE 7 is a sectional view taken transversely of the decoy showing it folded up;

FIGURE 9 is an enlarged sectional view taken on the line 9—9 of FIGURE 8.

Figure 8:
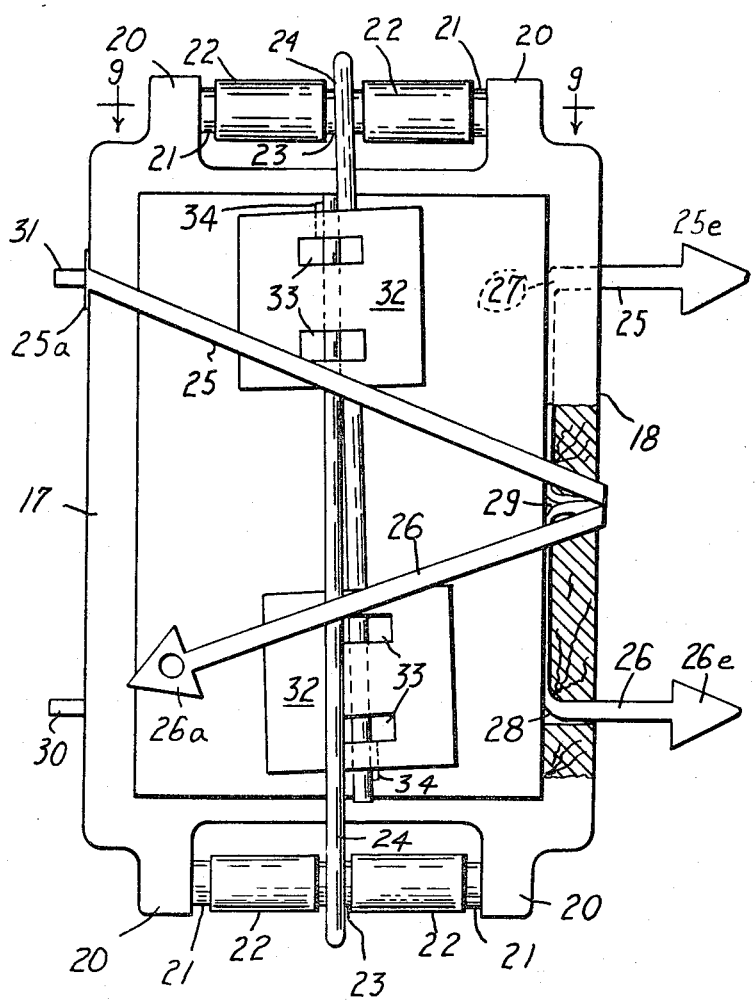
FIGURE 8 is an enlarged bottom view of the base floats and the standards as they appear when folded.

Referring now to the drawings my invention is embodied in a folding type decoy which comprises two side sheets 10 and 11 that are joined together along their top edges, a head and neck member 12 which is pivotally mounted between the side sheets 10 and 11 by a pivot member 13. The sheets 10 and 11 bear against the member 12 with sufficient force to hold the member 12 in any desired position by friction. Any suitable material can be used for the parts 10, 11 and 12. I have found that a thick cardboard coated with a waterproof paint or its equivalent to be satisfactory. The body sheets and neck member are colored to imitate the colors of the bird the decoy is intended to represent.

In order to secure the upper edges of the sheets 10 and 11 together so that they may be spread apart at the bottom, I utilize resilient means 14 to lace the two sheets 10 and 11 together. I have found rubber, either natural or synthetic, to be satisfactory for this purpose. The member 13 also is preferably resilient so as to avoid any necessity to crease or permanenaly bend the parts 10, 11 and 12.

To make the decoy floatable or capable of being stood up in a field, I provide a base float member 15 which is so secured to the parts 10 and 11 that it fits between them, both when the decoy is spread as shown in FIGURE 4 and when it is folded as shown in FIGURE 5. The nature of the float member 15 is more evident from FIGURES 6 to 9 and the following description.

The float member 15 preferably is made up of a central portion 16 of a foam plastic that will not absorb water and that is lighter than water. A pair of side frames 17 and 18 have projections 19 that seat the portion 16 and hold it. The side frames may be of waterproofed wood or of a suitable material, such as a synthetic resin, or metal. The frames have ears 20 at the ends thereof. Each ear 20 has a projection 21 extending toward the ear 20 opposite to it. These projections 21 mount sleeves 22 of thick resilient material which sleeves receive and frictionally hold cylindrical members 23. The members 23 have standards 24 secured thereto. These standards preferably are made of stiff wire so they may be forced into the ground for supporting the float member in a field.

In order to secure the sheets 10 and 11 to the float member 15 this member has two resilient straps 25 and 26 secured thereto. FIGURE 8 shows how these straps are mounted. The strap 26 extends through an aperture 28 in the frame 18, then along the face of the frame 18 to a center aperture 29 in the frame 18 and through this aperture. The strap 26 has an enlarged end 26e near the aperture 28. The other end of the strap 26 has an apertured enlargement 26a at its other end. The frame 17 has a projection 30 which is adapted to pass through one of the apertures 11a provided in the sheet 11 of the decoy body.

The strap 25 is passed through an aperture 27 in the frame 18 and through the aperture 29. It has an enlarged end 25e and an apertured enlarged end 25a. The end 25a is adapted to receive a projection 31 which passes through the other aperture 11a in the sheet 11.

The standards 24 are alike. Each one has the end portion which is secured to the cylindrical member 23 bent 180 degrees on a radius that is large enough to enable the major portion of the standard to lie flat against the float member 15 when the standard is folded as shown in FIGURE 8. Each standard carries a stabilizer plate 32 which has a section 33 thereof bent out of the plane of the plate so the standard can pass through it. Near the free end of the standard a lug 34 is formed on the standard to keep the plate from sliding off the standard. The section 33 has a notch 35 in it to receive the lug and keep the plate 32 in endwise alignment with the decoy body when the decoy is in the water. See FIGURE 1 of the drawings. Preferably the plates 32 are made of heavy material such as lead so that they tend to keep the decoy upright in rough water.

The decoys may, of course, be anchored with the anchors commonly used to anchor decoys in the water. Such devices are well known and therefore are not shown. The plates 32 do not interfere with use of the standards to support the decoys on land. They just slide up the standard when the standard is forced into the ground.

The device when used is normally like it is shown in FIGURES 1, 2, 4 and 6. The two side sheets 10 and 11 are spread apart and the member 12 is raised. The resilient means 14 stretches enough to allow the sheets 10 and 11 to fit against the frames 18 and 17 respectively of the float member 15. The straps 25 and 26 are threaded through apertures in the sheet 10 and thus secure the float member 15 and the sheet 10 together. The projections 30 and 31 are located in the apertures 11a of the sheet 11 and the end portions 25a and 26a are extended across the lower edge of the sheet 11 and hooked over the projections 31 and 30, respectively. The standards 24 are lowered as shown in FIGURE 1.

In order to fold the decoy for carrying the straps 25 and 26 are released from the projections 31 and 30. The float member 15 can swing free being held to the sheet 10 only by the ends 25e and 26e of the straps 25 and 26. The head member 12 is swung about the member 13 so it lies between the sheets 10 and 11. The standards 24 are swung against the member 15. The friction of the sleeves 22 on the cylindrical members 23 is sufficient to hold the standards in this position. The straps 25 and 26 are then passed over the standards and hooked on the posts or projections 31 and 30 so they are out of the way. The float member is folded between the sheets 10 and 11 making a compact assembly, as shown by FIGURES 5 and 7. The sheet 11 can be left free or a rubber band can be snapped around the folded decoy if desired.

While I have described one preferred form of my invention, it is obvious that changes in the details of construction may be made within the scope of my invention. My invention is defined in the following claims:

1. A decoy for birds comprising two stiff side sheets conforming generally to the body shape of the bird, said side sheets being pivotally secured together at the top thereof so their lower edges may swing toward and away from each other:
  a head and neck member secured to said sheets to project above them;
  a base float member pivotally secured to one of said sheets adjacent the lower edge thereof and movable between a position substantially parallel to the sheet to which it is secured and a horizontal position transverse to that sheet;
  means carried by said base float member engageable with the other side sheet operable to position the base float member in the said transverse position in engagement with both side sheets; and
  releasable means to secure the base float member and said other sheet in said position.

2. The decoy defined in claim 1 wherein the base float member has standards thereon foldable between a position extending away from the float member at substantially right angles thereto and a position flat against the float member.

3. The decoy defined in claim 1 wherein resilient strap means pivotally secure the side sheets together at the top thereof.

4. The decoy defined in claim 1 wherein the head and neck member is pivoted to said side sheets on an axis transverse to the sheets and foldable about its pivot to lie between them.

5. The decoy defined in claim 1 wherein resilient straps carried by the base float member pivotally secure it to the one sheet.

6. The decoy defined in claim 1 wherein said last named means comprises resilient straps on said base float member.

7. The decoy defined in claim 2 wherein said standards carry stabilizer plates with means to lock said plates in position to align longitudinally with the side sheets.

8. The decoy defined in claim 1 wherein the first named means comprises projections on the float member and the said other sheet is apertured adjacent to its free edge to receive said projections.

References Cited
UNITED STATES PATENTS

| | | | |
|---|---|---|---|
| 1,316,566 | 9/1919 | Fauble | 43—3 |
| 1,603,114 | 10/1926 | Johnson | 43—3 |
| 1,718,384 | 6/1929 | Sherman | 43—3 |
| 2,313,353 | 3/1943 | Mills | 43—3 |
| 2,450,572 | 10/1948 | Ballard | 43—3 |

WARNER H. CAMP, *Primary Examiner.*